United States Patent
Donaldson et al.

(10) Patent No.: US 7,233,473 B2
(45) Date of Patent: Jun. 19, 2007

(54) PROTECTION CIRCUIT AND METHOD FOR FLOATING POWER TRANSFER DEVICE

(75) Inventors: William Donaldson, Sunnyvale, CA (US); Edmond Toy, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 405 days.

(21) Appl. No.: 10/607,749

(22) Filed: Jun. 27, 2003

(65) Prior Publication Data

US 2004/0095787 A1 May 20, 2004

Related U.S. Application Data

(60) Provisional application No. 60/427,633, filed on Nov. 18, 2002.

(51) Int. Cl.
*H02H 5/04* (2006.01)
(52) U.S. Cl. .................................................. 361/103
(58) Field of Classification Search ................ 361/103; 317/18
See application file for complete search history.

(56) References Cited

U.S. PATENT DOCUMENTS

| | | | |
|---|---|---|---|
| 3,526,778 A * | 9/1970 | Crocker et al. ........... 290/30 R |
| 3,697,810 A * | 10/1972 | Wilson et al. ................. 361/44 |
| 4,047,091 A | 9/1977 | Hutchines et al. ............ 363/59 |
| 4,452,582 A * | 6/1984 | Portasik ........................ 431/27 |
| 4,807,104 A | 2/1989 | Floyd et al. ................... 363/59 |
| 5,142,435 A * | 8/1992 | Baumgartner et al. ....... 361/160 |
| 5,483,142 A * | 1/1996 | Skibinski et al. ............ 320/166 |
| 5,642,073 A | 6/1997 | Manning ...................... 327/536 |
| 5,808,883 A * | 9/1998 | Hawkes ........................ 363/60 |
| 5,841,725 A | 11/1998 | Kang et al. .................. 365/226 |
| 6,335,577 B1 * | 1/2002 | Baba ............................. 307/28 |
| 6,370,046 B1 * | 4/2002 | Nebrigic et al. .............. 363/60 |

* cited by examiner

Primary Examiner—Robert L. Deberadinis
Assistant Examiner—Luis E. Román (57) ABSTRACT

A protection circuit and method are provided for a floating power transfer device having one or more switches for controlling charging of a reservoir capacitor across which a load is applied when in use. The protection circuit includes a control circuit, a fault detection circuit and a precharge driver circuit. The control circuit at least partially controls switching of the at least one switch, while the fault detection circuit detects when a fault in the floating power transfer device or the load occurs and sends a fault detect signal to the control circuit in response thereto. The precharge driver circuit, which is enabled by the control circuit responsive to receipt of the fault detect signal, attempts to precharge the reservoir capacitor to a voltage level sufficient for switching of the one or more switches to proceed without damaging the switches.

19 Claims, 7 Drawing Sheets fig. 1 fig. 2 fig. 3 fig. 4 fig. 5 fig. 6 fig. 7 fig. 8 fig. 9

PROTECTION CIRCUIT AND METHOD FOR FLOATING POWER TRANSFER DEVICE

REFERENCE TO RELATED APPLICATION

This application claims the benefit of U.S. Provisional No. 60/427,633, filed Nov. 18, 2002. This provisional application is hereby incorporated by reference herein in its entirety.

FIELD OF THE INVENTION

The present invention relates in general to power transfer devices, and more particularly, to a protection circuit and protection method for low resistance switches of a floating power transfer device.

BACKGROUND OF THE INVENTION

Many system designs include power conversion circuitry to develop a required operating voltage. One such power conversion circuit is known as a charge pump. A charge pump is a device for creating increases in supply voltage or for inverting a supply voltage to generate a split supply. Many of these devices are related to applications using non-volatile memory circuits, which require a high voltage for programming. In a conventional charge pump power conversion circuit, the load device connects so that one terminal thereof is common to one of the supply terminals, typically the ground reference. U.S. Letters Pat. No. 4,807,104 discloses a power conversion circuit which is both a voltage multiplying and inverting charge pump. However, the output of the power conversion circuit remains referenced to the ground node.

In certain system implementations, it may be advantageous to power the system using a floating power transfer device. By floating the power transfer device, if a terminal in the system were to short, then the system may still be able to continue to operate. For example, in an automobile bus network, the signaling portion of the system on the bus could be floating relative to any other reference, such as ground or $V_{dd}$. This would provide enhanced fault tolerance by allowing communications to still occur notwithstanding a short at a terminal thereof.

SUMMARY OF THE INVENTION

The shortcomings of the prior art are overcome and additional advantages are provided through the provision of a protection circuit for a floating power transfer device. The protection circuit includes a control circuit, a fault detection circuit and a precharge driver circuit. The control circuit controls switching of at least one switch of the floating power transfer device, where the at least one switch controls charging of a reservoir capacitor of the device across which a load is applied when in use. The fault detection circuit detects when a fault occurs in at least one of the floating power transfer device or the load, and sends a fault detect signal to the control circuit responsive thereto. The precharge driver circuit precharges the reservoir capacitor and is enabled by the control circuit responsive to receipt of the fault detect signal from the fault detection circuit. When enabled, the precharge driver circuit attempts to precharge the reservoir capacitor to a voltage level sufficient for switching of the at least one switch to proceed without damaging the switch.

In another aspect, a floating power transfer device is provided. The floating power transfer device includes a reservoir capacitor across which a load is applied when in use and a power supply voltage for charging the reservoir capacitor. At least one switch is coupled between the power supply voltage and the reservoir capacitor to selectively connect and disconnect the power supply voltage from the reservoir capacitor. A protection circuit is provided for the at least one switch. This protection circuit includes a control circuit, a fault detection circuit and a precharge driver circuit. The control circuit at least partially controls switching of the at least one switch of the floating power transfer device, while the fault detection circuit detects a fault in either the floating power transfer device or the load, and responsive thereto sends a fault detect signal to the control circuit. The precharge driver circuit is enabled by the control circuit responsive to receipt of the fault detect signal, and when enabled, attempts to precharge the capacitor to a voltage level sufficient for switching of the at least one switch to proceed without damaging the at least one switch.

In a further aspect, a method for protecting switches of a floating power transfer device is provided. This method includes: controlling switching of at least one switch, the at least one switch controlling charging of a reservoir capacitor of the floating power transfer device across which a load is applied when in use; monitoring at least one of the floating power device and the load for detecting a fault, and upon detecting a fault, generating a fault detect signal; and responsive to generating of the fault detect signal, attempting to precharge the reservoir capacitor to a voltage level sufficient for switching of the at least one switch to proceed without damaging the at least one switch.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF EMBODIMENTS

Reference is now made to the drawings, wherein the same reference numbers used throughout different figures designate the same or similar components. One embodiment of a power transfer device for powering a load 12 is show in FIG. 1. This charge transfer device delivers charge onto a capacitor 11 through a switch 13, under control of a signal generator 15. Charge is provided by a power supply voltage ($V_{dd}$) 14. The power transfer device of FIG. 1 is referred to as a ground referenced charge transfer device since the device supplies power to the load via a ground referenced capacitance.

Figure 2:
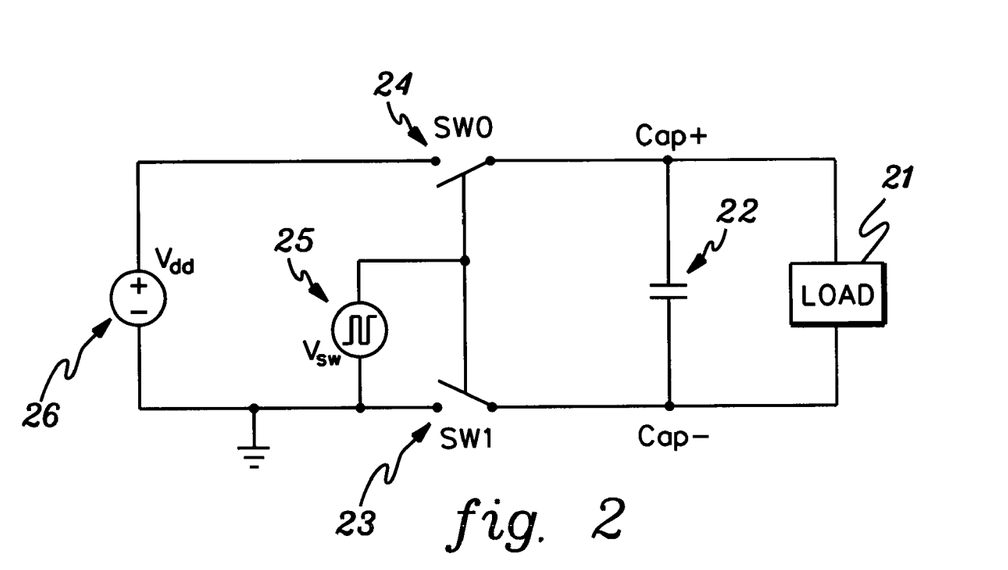
FIG. 2 is a schematic of one embodiment of a floating power transfer device for delivering power to a load through a floating reservoir capacitance.

A floating version of a power transfer device is depicted in FIG. 2. In this figure, a load 21 is powered by a reservoir capacitance 22. Charge is delivered onto capacitor 22 through switches 23 and 24, which are operated in tandem under control of a voltage switch signal 25. When both switches are closed (i.e., turned on), the power supply voltage ($V_{dd}$) 26 is applied across the capacitor 22. This power transfer device is floating because capacitor 22 is isolated from the grounded power supply 26 when the charging switches 23, 24 are opened (i.e., turned off). When the circuit is used to deliver power into a load device (e.g., as part of a voltage doubler), it is expected that there will be a permanent bias voltage across the capacitor. The power delivered to the load creates a ripple voltage on the reservoir capacitor, superimposed onto the bias voltage. When switches 23, 24 are closed (i.e., turned on), the lost charge (Q) is replenished and the reservoir capacitor voltage increases to the source value ($V_{dd}$).

Figure 1:
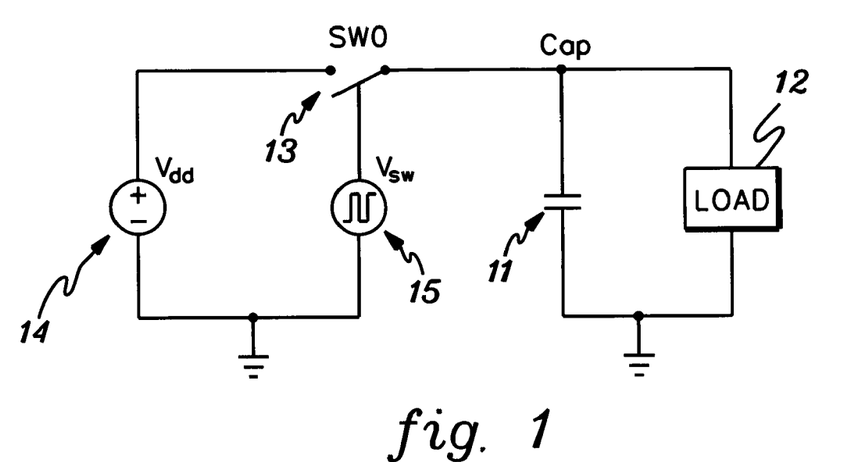
FIG. 1 is a schematic of one embodiment of a ground referenced, power transfer device for supplying power to a load via a ground referenced capacitance.

The load in FIG. 1 or 2 may be of any type of circuit, including a replication of either circuit shown, with the capacitor (11 or 22) replacing the voltage source (14 or 26), respectively. In metal-oxide-semiconductor (MOS) integrated circuits, the switch is implemented by a transistor. This device presents an on-resistance that determines the dynamics of the circuit operation.

When the power transfer device is initially turned-on, or there is a shorting fault across the capacitor (or the load), the full supply voltage is applied across the switch devices. Normally these circuits are used in low power applications where the switch resistance may be quite high and the supply voltage is generally low (e.g., less than 5V). In such a case, it may not be necessary to protect against such operating conditions.

However, start-up and fault conditions create a potentially damaging operating state if the charge transfer device is used to deliver power to the load. For such a device, switch transistors are made low ohmic to reduce system losses, which also diminishes power losses during the charging phase of operation. When there is no preexisting bias present on the reservoir capacitor (e.g., capacitor 11 or capacitor 22 in FIG. 1 or 2), it is possible for very high currents to flow through the switch. For example, with a 1Ω switch resistance, and a 20V supply, a current of 20 A is possible, briefly dissipating 400 W. With discrete devices, this may be possible, but not with low cost integrated solutions. Normally, the circuit might present a 1V difference across the switch, resulting in a more manageable current of 1 A.

Currently, floating charge transfer devices concentrate on low power systems that can absorb the increase in power during start-up. In these systems, the switches are generally of higher impedance than in the case of a floating power transfer device such as discussed herein.

Thus, provided herein is a protection circuit and protection method to prevent excessive currents and power dissipation during, for example, start-up or fault conditions, in floating capacitor charge circuits, referred to herein as floating power transfer devices. The protection circuit described below is able to directly or indirectly detect, for example, a low voltage across the reservoir capacitor during either phase of operation. One characteristic of the floating capacitance is the ability of the capacitor to float above or below the power supply ground reference during the period that the switches are disabled (i.e., turned off). Also, one issue to be addressed in providing a protection circuit for the switches is that the detection of a fault needs to be communicated from the floating capacitor side of the power transfer device (i.e., nodes Cap+, Cap−) to the grounded supply side (i.e., nodes $V_{dd}$, gnd).

Figure 3:
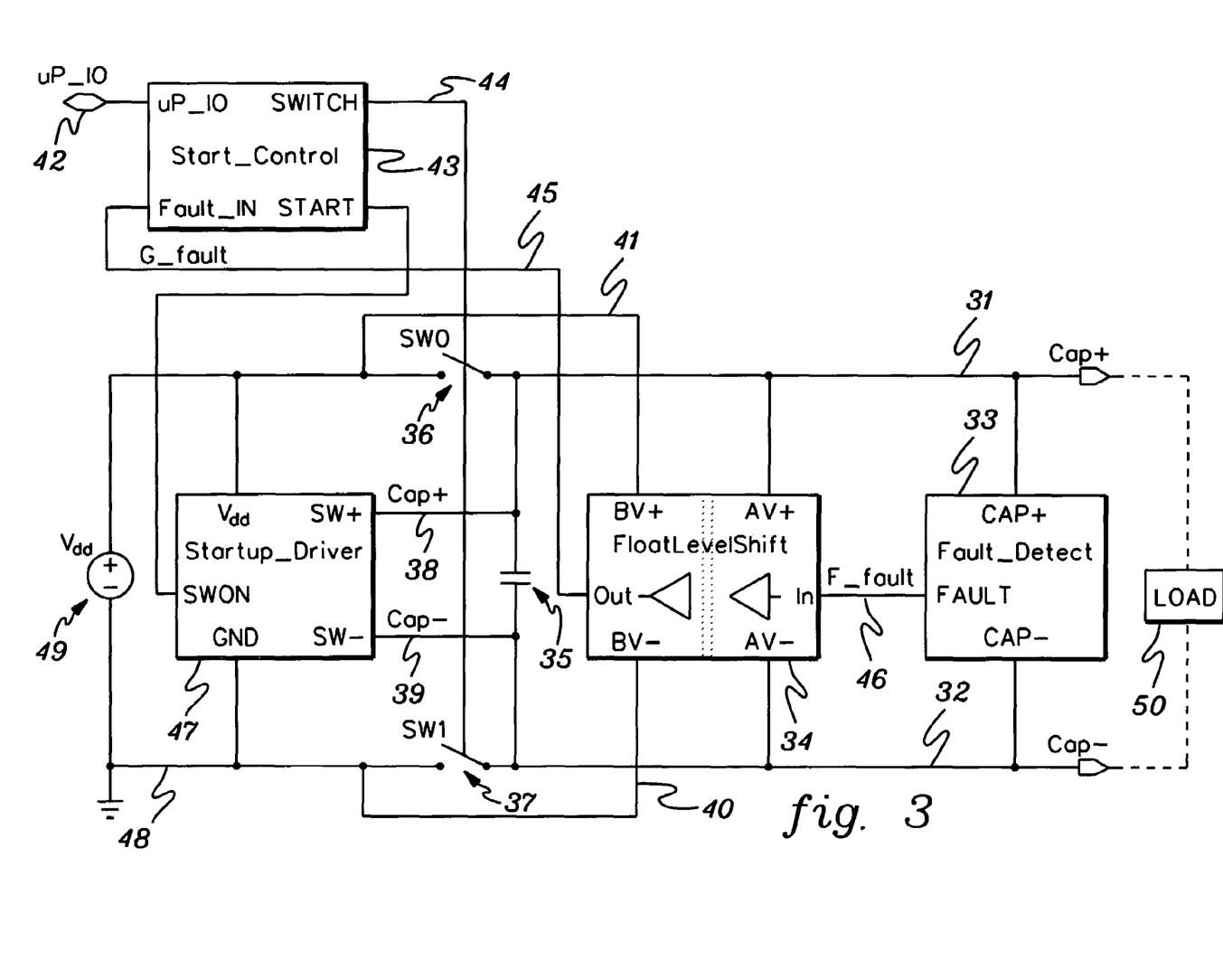
FIG. 3 is a schematic of one embodiment of a protection circuit for a floating power transfer device, in accordance with an aspect of the present invention.

One embodiment of a floating power transfer device and protection circuitry, in accordance with an aspect of the present invention, is depicted in FIG. 3. The device includes a pair of switches 36, 37, used during normal operation, a reservoir capacitor 35, and a power source 49 connected at one end to ground 48. These components, taken together, form a circuit similar to that depicted in FIG. 2. This circuit supplies power to a load 50 when in use.

The protection circuitry includes a fault detection circuit 33, which can directly or indirectly monitor voltage across capacitor 35. In this example, fault detection circuit 33 is connected between terminals Cap+ 31 & Cap− 32, possibly deriving its power supply from the same terminals. The fault detection circuit may be a passive detector that is capable of operating over all possible voltages, from 0V up to an arbitrary maximum. A fault is determined to occur, in one example, when voltage across reservoir capacitor 35 falls below a fault threshold. This threshold is set low enough to allow normal operation, while high enough to prevent damage from occurring due to excessive currents flowing through the switches 36, 37. For instance, with a 20V supply, and a switch resistance of 1Ω, a maximum current of 2 A would set a minimum capacitor voltage of 16V before protection is required. So, if a short occurs during normal operation, or some other event causes the capacitor voltage to fall below the fault threshold (e.g., 16V in this example), then a fault detect signal 46 is asserted. This signal is transferred to a control circuit 43 through a floating-to-ground shifter 34 as output 45 from the floating level shift circuit. Circuit 34 connects between floating nodes 31, 32, as well as between the ground referenced nodes 41, 40. Control circuit 43 may be implemented as a logic circuit, or as a program which processes the fault detect signal and decides whether to allow the main switches 36 & 37 to turn-on.

At turn-on, there is a voltage available from source 49, but reservoir capacitor 35 is completely discharged, i.e., the capacitor voltage is 0V. In this case, a fault is detected by the fault detection circuit 33 and its presence is signaled to control circuit 43. To enable switches 36, 37 while the capacitor remains in this state would lead to the failure of the switches. This might be an immediate failure, or it may manifest itself as a curtailed lifetime for the components, depending upon the time taken to restore the capacitor's voltage to its normal state.

In one implementation, the control circuit 43 serves as an interface between the normal control logic and switches 36, 37. Control signals from an external device determine the switch state (on node switch 44), through interface node uPIO 42. The fault_IN connects through the float level shift circuit 34 to the fault detection circuit 33. Additional signals indicating a fault state may be made available to the external device through interface uPIO 42.

When a fault is asserted, the control block 43 insures that the switches 36, 37 are disabled, preventing further dissipation by these switches. On the next appropriate control phase (i.e., when the switches would normally be enabled), a separate precharge driver circuit 47 is enabled. This circuit 47 is capable of delivering charge to the reservoir capacitor 35 without causing damage to the circuit. It achieves this by using current-limited output devices that prevent the charging process from causing excessive power dissipation. When the switch on (SWON) input to recharge driver circuit 47 is enabled, outputs 38, 39 turn-on and the capacitor charges. The control circuit 43 may enable these outputs 38, 39 continuously until the detected fault condition is removed, or it may cycle through charging and hold phases, emulating the normal mode of operation. By this method, the protection circuit prevents damaging currents from flowing through the power transfer device during the start-up phase. One consequence of this technique is the requirement for a minimum start-up period before normal operation is commenced. The duration of this period is determined by the various factors affecting the circuit operation and the level of protection required. In a practical implementation, an additional delay of several normal switch cycles may be added to insure that the system has reached a stable operating state before enabling the complete circuit. An external control device may be aware of the start-up condition and use that information to enable the start-up sequence described above. In such a case, it is possible to use different control sequences for start-up and fault conditions.

When a fault occurs during normal operation that causes, for example, the voltage on capacitor 35 to fall below the set fault threshold, then switches 36, 37 are turned off and the control block 43 attempts to restart the circuit. This may follow the full start-up cycle (when there is no distinction between start-up and fault), or it may follow a shortened cycle. A shortened cycle would charge the capacitor 35, then turn-off the precharge driver circuit 47 and evaluate the fault signal again. If no further fault state is detected, then control is returned to normal operation. With the full cycle, a repeated start-up attempt is made. When a predetermined number of attempts is exceeded, the circuit is resolved to be in a fault state and the control circuit 43 disables further attempts until reset by some external control. A fault state signal can be passed back to the external control through the uPIO node 42.

Figure 4:
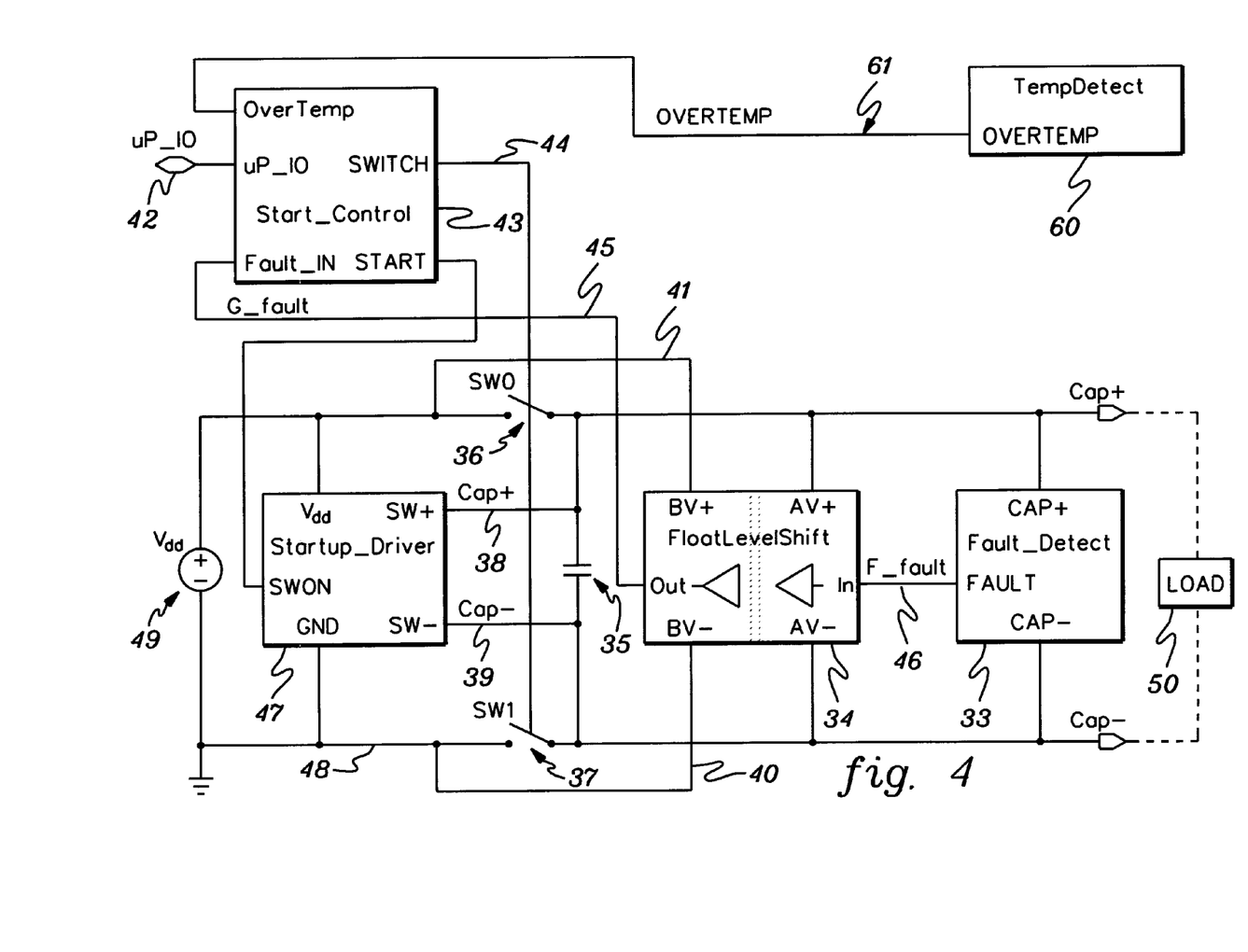
FIG. 4 is a schematic of another embodiment of a protection circuit for a floating power transfer device, in accordance with an aspect of the present invention.

FIG. 4 depicts a refinement of the protected, floating power transfer device of FIG. 3. In this embodiment, a thermal detection circuit 60 is provided to complement the fault detection. Temperature detection can be useful when the device and detection circuit are implemented on a single integrated circuit (IC). When a fault occurs and the circuit operates close to the fault detection threshold, the IC may show excessive power dissipation. The chip temperature increases rapidly when this happens and the thermal detection circuit 60 can detect a temperature change beyond the normal expected operating range. The output signal 61 asserts a fault to the control circuit 43. In this case, the type of fault can be registered and output switches 36, 37 disabled. A restart can be attempted and if the fault is detected again, the control circuitry can flag the fault back to the external logic, again, by the uPIO 42 interface. When this happens, the control circuit prevents any further operation of the switches until an external signal initiates a restart. The balance of the protection circuit and floating power transfer device depicted in FIG. 4 operates as described above in connection with FIG. 3.

Figure 5:
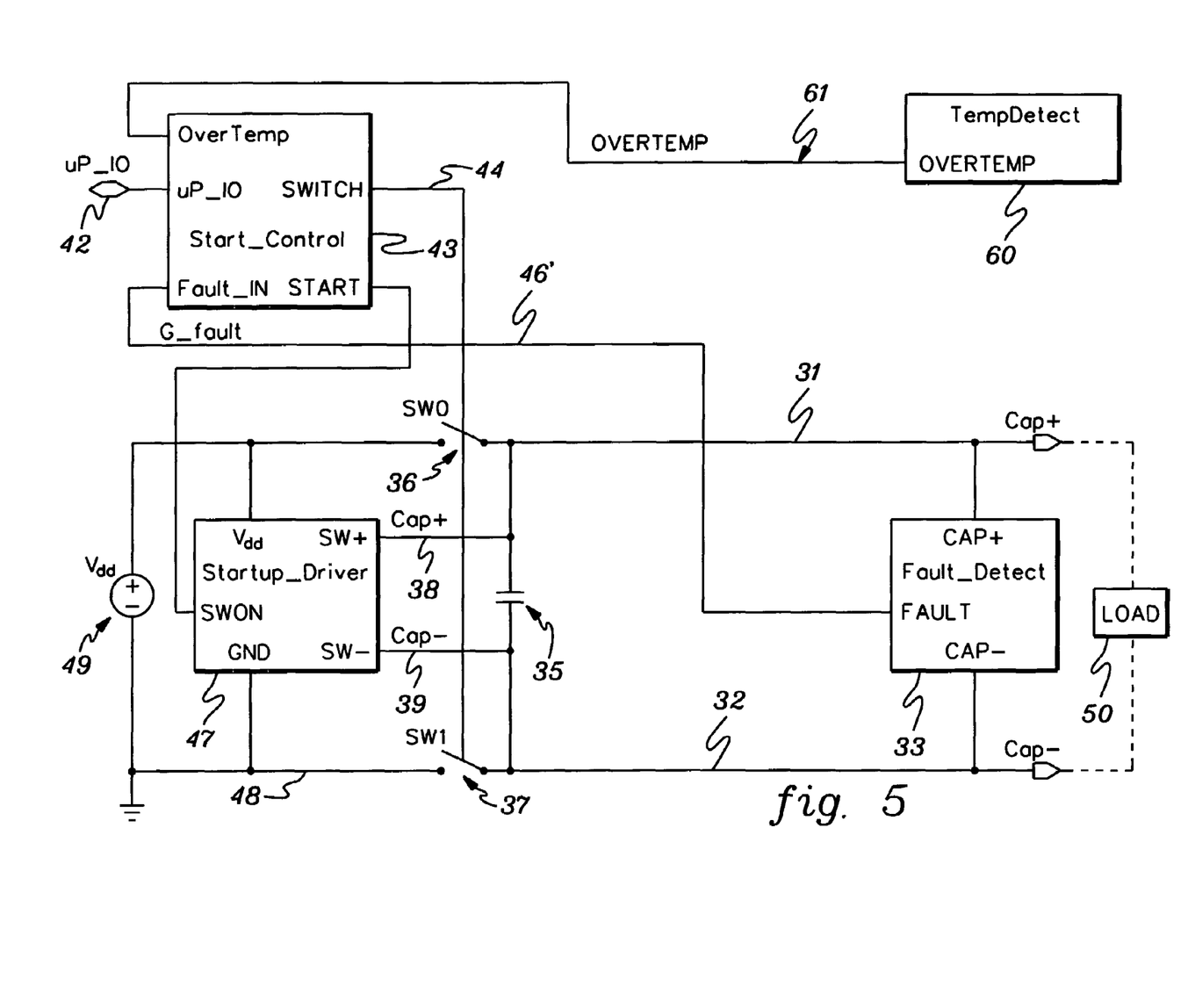
FIG. 5 is a schematic of still another embodiment of a protection circuit for a floating power transfer device, in accordance with an aspect of the present invention.

In certain circumstances, the protection circuitry of FIGS. 3 & 4 may be simplified by eliminating the float level shift circuit 34 of those figures. The resulting implementation is depicted in FIG. 5. By eliminating the float level shift circuit, fault detection becomes possible only while switches 36, 37 are enabled. The output of the fault detection circuit 43 is also now referenced to the ground node 48. The operating principal of this variation has the fault detection occurring during the first part of the switch closure phase. Alternatively, the low-current precharge driver circuit 47 can be enabled prior to the switches, allowing a short detection phase to occur ahead of the principal power phase, which enables the switches 36, 37. When this method is employed, it is possible for the detection circuit connected between the capacitors to be mainly passive devices.

Various specific details of implementation of the protection circuit embodiments of FIGS. 3–5 are described below with reference to FIGS. 6–9. The protection circuit described herein can form part of a custom IC that uses double-diffused metal-oxide semiconductor (DMOS) transistors for the switching devices. A silicon-on-insulator (SOI) structure allows individual transistors to be electrically isolated from one another. The fault detection could follow the form shown in FIG. 5, using passive detection devices.

Figure 6:
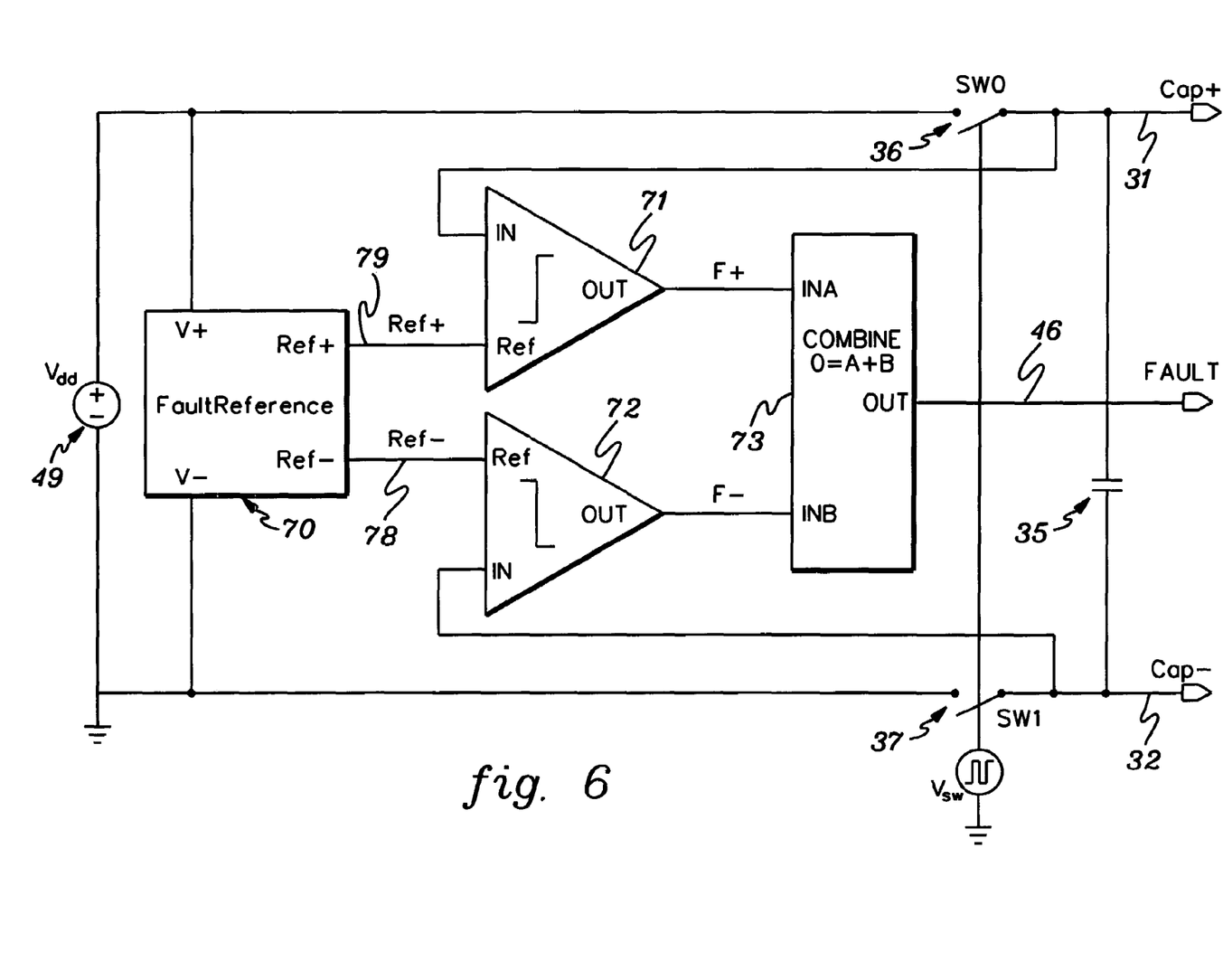
FIG. 6 is a schematic of one embodiment of a fault detection circuit for use in the protection circuit of FIGS. 3–5, in accordance with an aspect of the present invention.

FIG. 6 depicts one embodiment of a fault detection circuit 33. This circuit includes a fault reference generating circuit 70, producing two output reference values 78, 79 (i.e., ref– 78 relative to ground, and ref+ 79 relative to the positive supply 49). Two comparators 71 & 72 compare these reference voltages to the voltages on the reservoir capacitor 35 during the period that the switches are closed (i.e., turned on). This allows the detection of excess voltage drops across individual switches 36, 37. The reason for this is to enable the detection of shorts on the capacitor output nodes 31, 32. A short may only show a fault at one terminal, so both should be tested to insure full coverage of potentially damaging fault conditions. The resulting outputs may be combined into a single fault detect signal or flag 46. The comparators have high impedance inputs and gate clamps to protect their inputs from damage during the floating phase of operation. The fault reference generating circuit 70 may be any circuit capable of generating voltage references relative to both supplies. The values required for the reference voltages are determined by the switch resistance and the ability of the IC to dissipate power.

Figure 7:
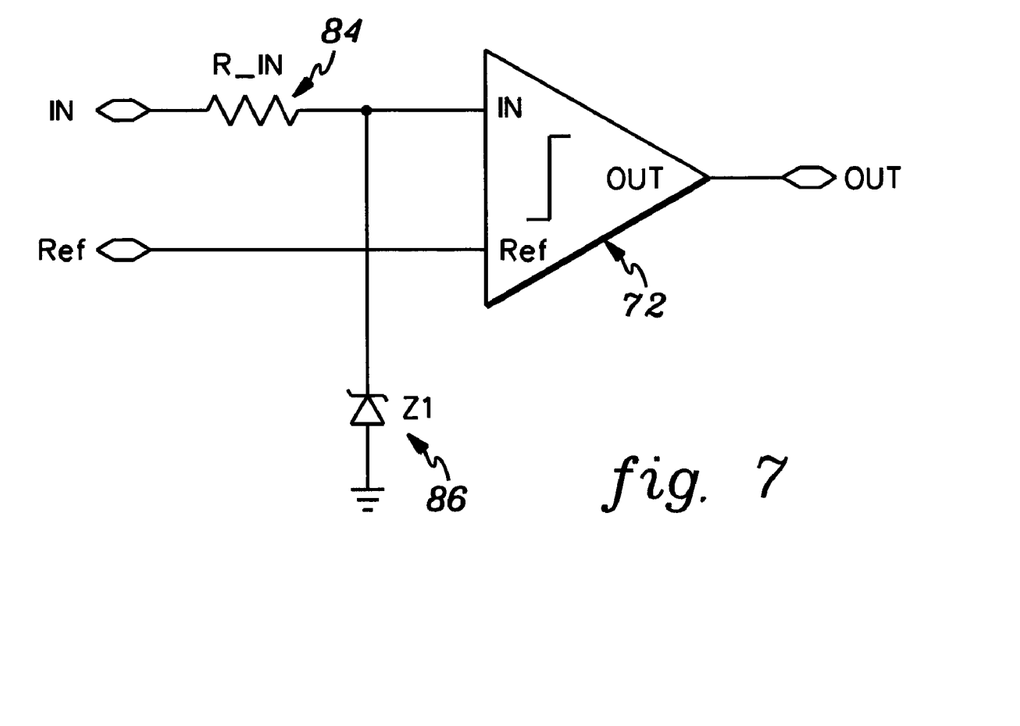
FIG. 7 is a schematic of one embodiment of a comparator with a gate-clamp referenced to the ground node for use in the fault detection circuit of FIG. 6, in accordance with an aspect of the present invention.
Figure 8:
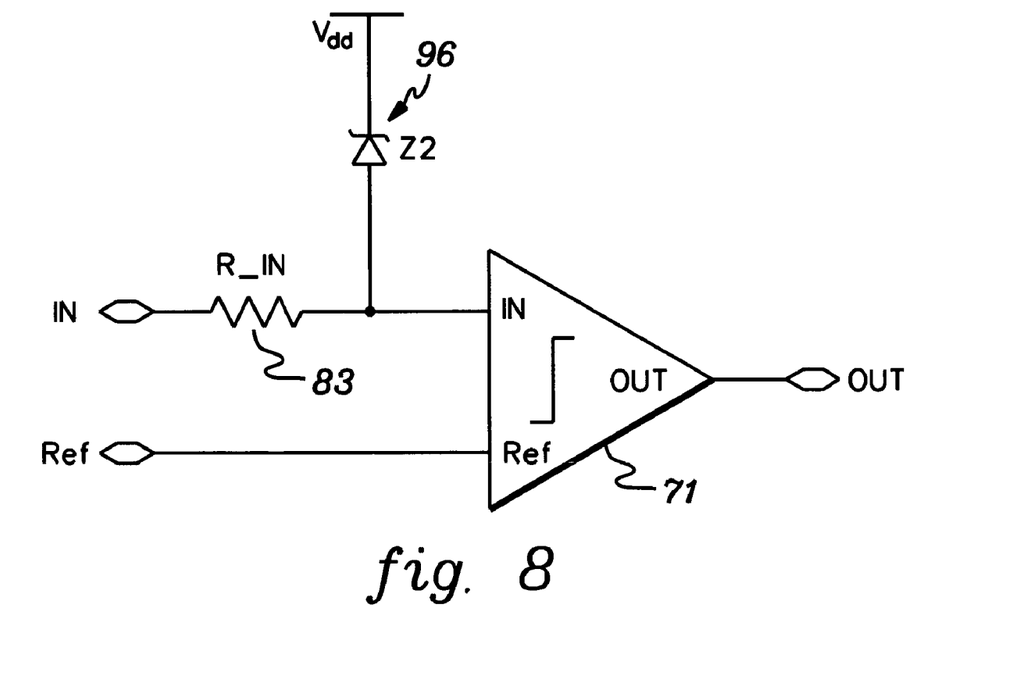
FIG. 8 is a schematic of another embodiment of a comparator with a gate-clamp referenced to a positive supply for use in the fault detection circuit of FIG. 6, in accordance with an aspect of the present invention.

Other embodiments of the comparator circuitry 72, 71 for the fault detection circuit 33 of FIG. 6 are depicted in FIGS. 7 & 8, respectively. A comparator with a gate-clamp referenced to the ground node is depicted in FIG. 7, while a positive supply referenced gate-clamp is shown in FIG. 8. The operating principle is the same for both. The high value series input resistor R 84, 83 isolates the input from the comparator 72, 71 of FIGS. 7 & 8, respectively. A zener diode 86, 96 clamps the comparator input to a voltage that does not exceed its input breakdown voltage. If the input swings beyond the supply voltage (ground or $V_{dd}$ in FIGS. 7 & 8, respectively), then the zener diode 86, 96 acts like a diode and limits the input swing in the opposite direction.

The precharge driver circuit 47 in FIGS. 3–5 may be any circuit that can be controlled, and is capable of limiting the current delivered to the capacitor reservoir 35. In one implementation, the precharge driver circuit can act as a current source on both output terminals. In the absence of a fault, the reservoir capacitor charges at a predetermined rate. As the capacitor charges, the current-source behavior changes from current source to a high-impedance switch. The actual switch impedance is set to allow the start-up time to be minimized, without introducing damaging power dissipation.

Figure 9:
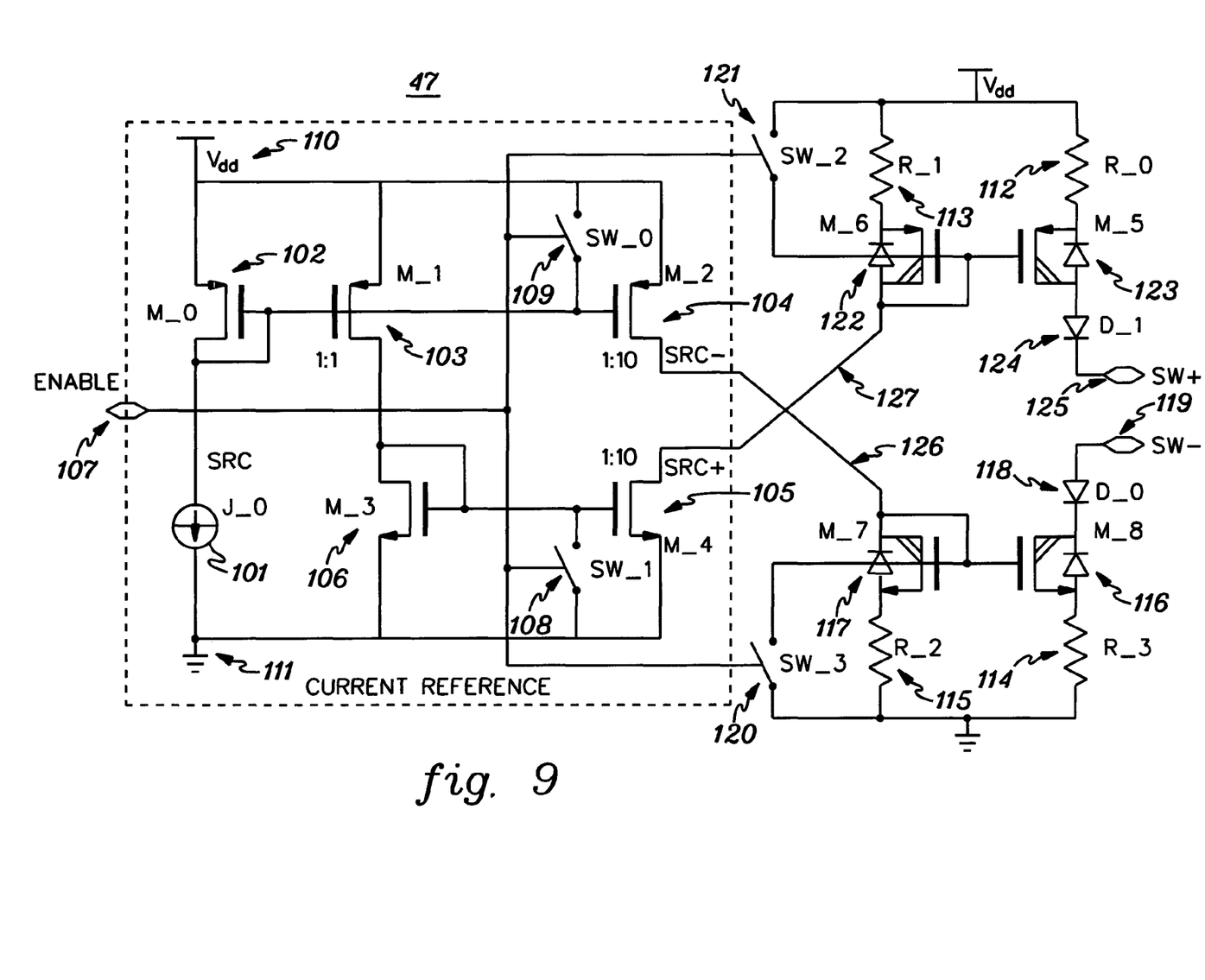
FIG. 9 is a detailed schematic of one embodiment of a precharge driver circuit for the protection circuits of FIGS. 3–5, in accordance with an aspect of the present invention.

The circuit of FIG. 9 shows one implementation of the precharge driver circuit 47, which includes a current reference sub-block and an output section. A current source 101 defines a low-value current (e.g., 2 µA). Transistors 102, 103, 104 form a current mirror with two outputs, including node SRC− 126, that reflect the reference current. The output from transistor M_1 103 is used in the complementary current mirror formed by transistors 105, 106, creating a single output node SRC+ 127. Two switches 108, 109 controlled by the ENABLE input 107 disable the outputs SRC+, SRC− of the current reference sub-block. The complementary output sections 112, 113, 121, 122, 123, 124, 125 and 114, 115, 116, 117, 118, 119, 120 create current-limited outputs controlled by the ENABLE input. When switches 120, 121 are on, the outputs are off and no current is available at the terminals SW+ and SW− 125, 119. The output diodes 118, 124 insure that the implicit diodes of the output DMOS transistors 116, 123 are never forward biased when the reservoir capacitor (connected between the SW+ and SW− terminals 125, 119), is floating relative to ground 111. Current scaling is used to boost the reference current by a factor of 10× in the current reference sub-block. A further 200× is obtained by a combination of resistor 112, 113 ratio and transistor ratio 122, 123, for output SW+ 125. Output SW− 119 is scaled in a similar manner.

The overall accuracy obtained by the precharge driver circuit is not critical to its performance. Its primary function is to enable the safe charging of the reservoir capacitor after the circuit is started or a fault is detected. The timing of the start-up may be improved by tighter control of the charging currents, but the benefit has to be weighed against increased circuit complexity. In normal operation, the precharge driver circuit 47 may switch only during the controlled start-up, or it may switch continuously in synchronism with the main switches 36, 37.

The control circuit 43 (see FIGS. 3–5) contains the digital functionality for the system. This control circuit receives a fault detect signal, responds thereto by turning off the switches 36, 37 and report backs to an external device. The external device may initiate the start-up (assuming an a-priori knowledge of the system) through the start_control circuit 43.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A protection circuit comprising:
  a control circuit for controlling switching of at least one switch of a floating power transfer device, the at least one switch controlling charging of a reservoir capacitor of the floating power transfer device across which a load is applied when in use;
  a fault detection circuit for detecting a fault in at least one of the floating power transfer device or the load, and for sending a fault detect signal to the control circuit responsive thereto; and
  a precharge driver circuit for pre-charging the reservoir capacitor, the precharge driver circuit being enabled by the control circuit responsive to receipt of the fault detect signal from the fault detection circuit, wherein when enabled, the precharge driver circuit attempts to precharge the reservoir capacitor to a voltage level sufficient for switching of the at least one switch to proceed without damaging the at least one switch.

2. The protection circuit of claim 1, wherein the fault detection circuit resides in a floating portion of the floating power transfer device and the control circuit resides in a ground referenced portion of the floating power transfer device, and wherein the protection circuit further comprises a float level shift circuit for shifting the fault detect signal from the floating portion of the floating power transfer device to the ground referenced portion for forwarding to the control circuit.

3. The protection circuit of claim 1, wherein the fault detection circuit further comprises circuitry for directly or indirectly monitoring when voltage across the reservoir capacitor of the floating power transfer device falls below a fault threshold, and for sending the fault detect signal to the control circuit responsive thereto.

4. The protection circuit of claim 1, wherein the floating power transfer device further comprises a power supply having a voltage level in a range of 5 to 20 volts, the power supply charging the reservoir capacitor of the floating power transfer device when the at least one switch is turned on.

5. The protection circuit of claim 4, wherein the at least one switch comprises two switches operated in tandem for cyclically applying the power supply voltage across the reservoir capacitor to charge the capacitor.

6. The protection circuit of claim 1, further comprising a temperature sensor for detecting when temperature of the at least one switch rises above a set temperature level, and for sending an over temperature signal to the control circuit responsive thereto, and wherein the control circuit further comprises means for temporarily shutting down the floating power transfer device and subsequently reinitiating a startup procedure responsive to receipt of the over temperature signal.

7. A device comprising:
  a reservoir capacitor across which a load is applied when in use;
  a power supply voltage for charging the reservoir capacitor;
  at least one switch coupled between the power supply voltage and the reservoir capacitor to selectively connect and disconnect the power supply voltage from the reservoir capacitor; and
  a protection circuit for the at least one switch, the protection circuit including:
    a control circuit for controlling switching of the at least one switch of the device,
    a fault detection circuit for detecting a fault in at least one of the device or the load, and for sending a fault detect signal to the control circuit responsive thereto, and
    a precharge driver circuit for precharging the reservoir capacitor, the precharge driver circuit being enabled by the control circuit responsive to receipt of the fault detect signal from the fault detection circuit, and wherein when enabled, the precharge driver circuit attempts to precharge the reservoir capacitor to a voltage level sufficient for switching of the at least one switch to proceed without damaging the at least one switch.

8. The device of claim 7, wherein the fault detection circuit resides in a floating portion of the floating power transfer device and the control circuit resides in a ground referenced portion of the floating power transfer device, and wherein the protection circuit further comprises a float level shift circuit for shifting the fault detect signal from the floating portion of the floating power transfer device to the ground referenced portion for forwarding to the control circuit.

9. The device of claim 7, wherein the fault detection circuit further comprises circuitry for directly or indirectly monitoring when voltage across the reservoir capacitor Calls below a fault threshold, and for sending the fault detect signal to the control circuit responsive thereto.

10. The device of claim 7, wherein the power supply has a voltage level in a range of approximately 5 to approximately 20 volts and the power supply charges the reservoir capacitor when the at least one switch is turned on.

11. The device of claim 10, wherein the at least switch comprises two switches operated in tandem for cyclically applying the power supply voltage across the reservoir capacitor to charge the capacitor.

12. The device of claim 7, wherein the protection circuit further comprises a temperature sensor for detecting when temperature of the at least one switch rises above a set temperature level, and for sending an over temperature signal to the control circuit responsive thereto, and wherein the control circuit further comprises means far temporarily shutting down the floating power transfer device and subsequently reinitiating a start-up procedure responsive to receipt of the over temperature signal.

13. A method comprising:
controlling switching of at least one switch, the at least one switch controlling charging of a reservoir capacitor of a floating power transfer device across which a load is applied when in use;
monitoring at least one of the floating power device and the load for detecting a fault, and upon detecting a fault, generating a fault detect signal; and
responsive to generating of the fault detect signal, attempting to precharge the reservoir capacitor to a voltage level sufficient for switching of the at least one switch to proceed without damaging the at least one switch.

14. The method of claim 13, wherein the controlling is performed from a ground referenced portion of the floating power transfer device and the monitoring is performed from a floating portion of the floating power transfer device, and wherein the method further comprises level shifting the generated fault detect signal from the floating portion to the ground referenced portion for use in initiating the attempting to precharge the reservoir capacitor.

15. The method of claim 13, wherein the monitoring comprises monitoring directly or indirectly when voltage across the reservoir capacitor falls below a fault threshold, and for generating the fault detect signal responsive thereto.

16. The method of claim 13, wherein charging of the reservoir capacitor of the floating power transfer device is from a power supply having voltage level in a range of 5 to 20 volts, wherein the power supply charges the reservoir capacitor of the floating power transfer device when the at least one switch is turned on.

17. The method of claim 16, wherein the at least one switch comprises two switches operated in tandem for cyclically applying the power supply voltage across the reservoir capacitor to charge the capacitor.

18. The method or claim 13, further comprising monitoring temperature of the at least one switch, and generating an over temperature signal when the temperature of the at least one switch rises above a set temperature level, and wherein the method further comprises temporarily shutting down the floating power transfer device and subsequently reinitiating a start-up procedure responsive to generating of the over temperature signal.

19. A circuit comprising:
means for controlling switching of at least one switch, the at least one switch controlling charging of a reservoir capacitor or a floating power transfer device across which a load is applied when in use;
means for monitoring at least one of the floating power device and the load for detecting a fault, and upon detecting a fault, for generating a fault detect signal; and
means for attempting, responsive to generating of the fault detect signal, to precharge the reservoir capacitor to a voltage level sufficient for switching of the at least one switch to proceed without damaging the at least one switch.

* * * * *